(12) United States Patent
Bronnikov

(10) Patent No.: US 10,474,656 B1
(45) Date of Patent: Nov. 12, 2019

(54) REPURPOSING LOG FILES

(71) Applicant: Nutanix, Inc., San Jose, CA (US)

(72) Inventor: Dmitri Bronnikov, Foster City, CA (US)

(73) Assignee: NUTANIX, INC., San Jose, CA (US)

( * ) Notice: Subject to any disclaimer, the term of this patent is extended or adjusted under 35 U.S.C. 154(b) by 208 days.

(21) Appl. No.: 15/438,703

(22) Filed: Feb. 21, 2017

(51) Int. Cl.
*G06F 17/30* (2006.01)
*G06F 16/22* (2019.01)
*G06F 16/215* (2019.01)
*G06F 16/21* (2019.01)

(52) U.S. Cl.
CPC ........ *G06F 16/2272* (2019.01); *G06F 16/215* (2019.01); *G06F 16/217* (2019.01)

(58) Field of Classification Search
USPC ................................. 707/741; 711/103, 100
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 8,997,097 B1 | 3/2015 | Aron et al. | |
| 9,052,936 B1 | 6/2015 | Aron et al. | |
| 9,229,854 B1* | 1/2016 | Kuzmin | G06F 8/654 |
| 9,256,374 B1 | 2/2016 | Aron et al. | |
| 9,256,475 B1 | 2/2016 | Aron et al. | |
| 9,354,912 B1 | 5/2016 | Aron et al. | |
| 9,389,887 B1 | 7/2016 | Aron et al. | |
| 9,575,784 B1 | 2/2017 | Aron et al. | |
| 9,619,257 B1 | 4/2017 | Aron et al. | |
| 9,772,866 B1 | 9/2017 | Aron et al. | |
| 2013/0332660 A1* | 12/2013 | Talagala | G06F 12/0246 711/103 |
| 2014/0280197 A1* | 9/2014 | Gatto | G06F 11/3409 707/741 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Hung T Vy
(74) *Attorney, Agent, or Firm* — Vista IP Law Group, LLP

(57) ABSTRACT

Systems and methods for key-value pair management. A method embodiment commences upon receiving data records comprising key-value pairs. The key-value pairs are stored in two locations, (1) in an in-memory data structure in a first storage tier, and (2) in a log file in a second storage tier. At some moment in time, an event causes a flush of the in-memory data structure. The flush operations comprise renaming the log file to refer to it as a uniquely identifiable data file in the second storage tier, and populating an index file in the second storage tier. Requests for a value corresponding to a key is satisfied by using the index file to access the uniquely identifiable data file by byte or word offset to a location in the data file so as to retrieve the value of the corresponding key.

20 Claims, 15 Drawing Sheets

(56) References Cited

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Wikipedia, the free encyclopedia, "Key-value database", Nov. 3, 2016, 4 pages.

* cited by examiner

REPURPOSING LOG FILES

FIELD

This disclosure relates to multi-tier data storage, and more particularly to techniques for repurposing log files.

BACKGROUND

Modern computing and storage systems manage increasingly large volumes of data that originates from a variety of data sources. For example, streaming data collected from a myriad of information sensing devices (e.g., mobile phones, online computers, RFID tags, sensors, etc.) and/or operational sources (e.g., point of sale systems, accounting systems, CRM systems, etc.) is growing exponentially. With the proliferation of Internet of Things (IoT) rollouts, the variety, volume, and velocity of data ingested by computing and storage systems continues to explode. Oftentimes the measurements, observations or transactions deriving from sensing devices and/or operational sources are structured as key-value pairs. The sheer number of data sources that produce such measurements, observations or transactions results in a high volume and high velocity of data to be managed by the computing and storage systems.

In some cases, a distributed storage system is implemented to manage the ever-increasing storage capacity and storage I/O demands. Distributed storage systems can aggregate various physical storage facilities (e.g., at multiple compute nodes in a cluster) to create a logical storage facility where data may be efficiently distributed according to various devices or device characteristics (e.g., storage access latency, storage cost, etc.), subdivisions (e.g., by compute node), and/or performance objectives (e.g., resource usage balancing, data durability, data availability, etc.). For example, a storage facility might have two storage tiers comprising an in-memory storage tier (e.g., a tier that is implemented using random access memory (RAM)) and an on-disk storage tier (e.g., a tier implemented using solid state storage (SSD) and/or hard disk drives (HDDs)). The in-memory storage tier provides low latency access to data in that tier (e.g., "hot" data) and the on-disk storage tier provides low cost storage of other data (e.g., "cold" data).

Unfortunately, managing increasingly larger volumes of data that originate from disparate data sources in computing and storage systems can present challenges. In some cases, ingested data (e.g., key-value pairs) might be stored in an in-memory storage tier using a certain structure, such as a binary search tree (BST), to facilitate low latency access to the values using fast access by key. Concurrently, as key-value pairs are received, a log file comprising the received key-value pairs are stored in an on-disk storage tier (e.g., to assure data retention even in the case of a service interruption).

At some moment in time, the amount of memory storage consumed by the BST in the in-memory storage tier might breach some predetermined size or utilization threshold. Or, at some moment in time, the depth or breadth of the BST might grow to an extent that reduces the search efficiency of the tree below some acceptable search efficiency threshold. Some legacy techniques address such size and efficiency issues by creating instances of a key index table and associated value table in disk storage to accept a transfer (e.g., a "flush" or a "purge") of the then-current key-value pairs from memory storage. This flush of the data from the in-memory storage tier to an on-disk storage tier results in reclamation of storage capacity in the in-memory tier. However, in high velocity and high volume data environments (e.g., IoT environments, etc.), the computing, networking, and storage resources consumed to continually create the on-disk tables to store the purged in-memory data can become significant. What is needed is a technological solution for efficiently managing access and durability of large volumes of key-value pairs while observing characteristics and limitations of the multi-tier storage facilities.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for repurposing log files (e.g., redo/undo log files), which techniques advance the relevant technologies to address technological issues with legacy approaches. More specifically, the present disclosure provides a detailed description of techniques used in systems, methods, and in computer program products for purging key-value pairs from an in-memory storage tier to an on-disk storage tier. Certain embodiments are directed to technological solutions for flushing data records from one storage tier to a data file of another storage tier by renaming an existing log file to be the data file and then indexing the data records of the data file.

The disclosed embodiments modify and improve over legacy approaches. In particular, the herein-disclosed techniques provide technical solutions that address the technical problems attendant to efficiently managing access and durability of key-value pairs across storage tiers. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high performance computing as well as advances in various technical fields related to data storage.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
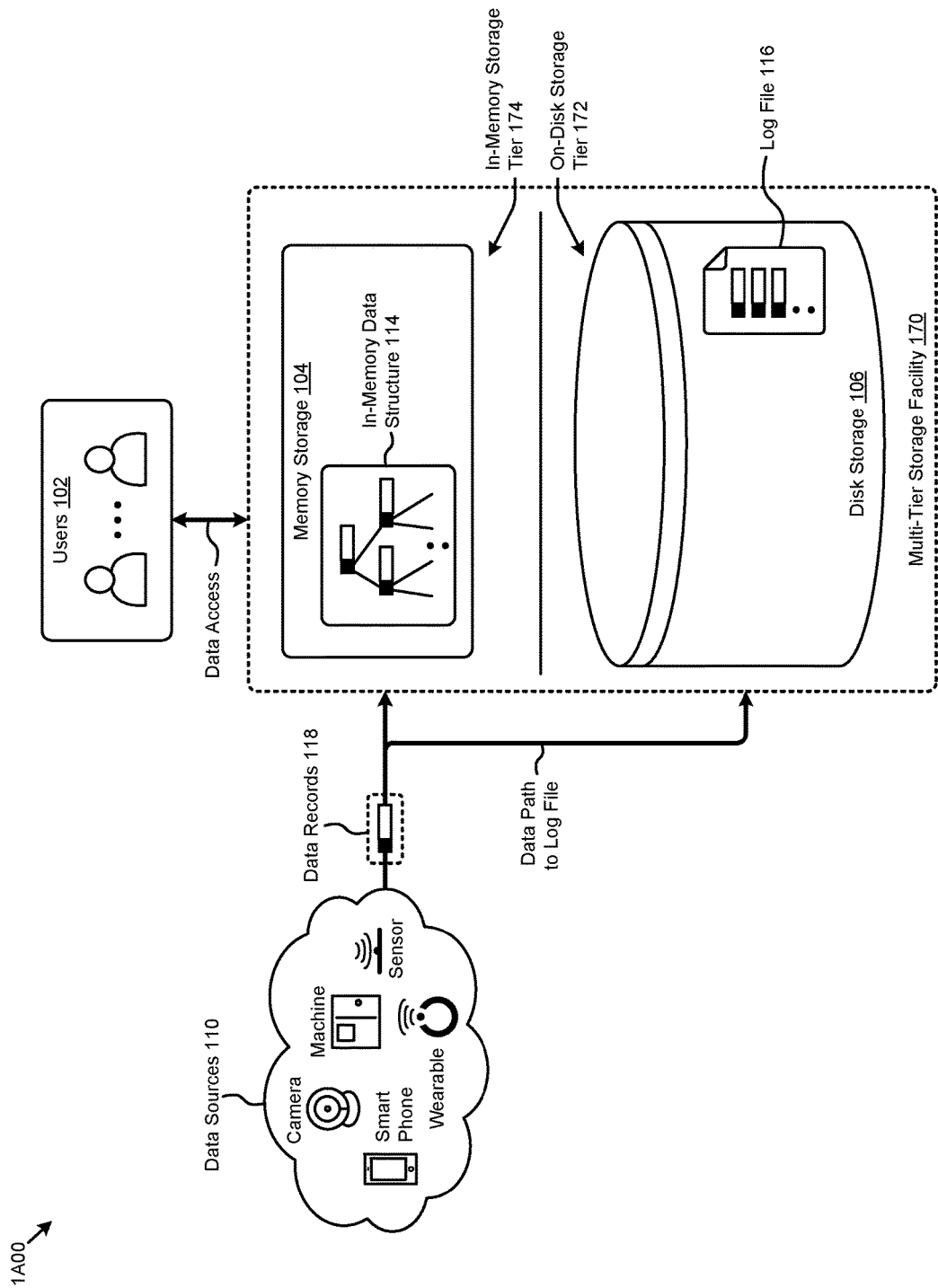
FIG. 1A and FIG. 1B illustrate computing environments in which embodiments of the present disclosure can be implemented.

Embodiments in accordance with the present disclosure address the problem of efficiently managing access and durability of key-value pairs across storage tiers. Some embodiments are directed to approaches for flushing data records from one storage tier to a uniquely identifiable data file of another storage tier by renaming an existing log file comprising the data records to the data file and then indexing the data records of the data file.

Overview

Disclosed herein are techniques for flushing a data set from one storage tier (e.g., low latency memory storage) by renaming and indexing a log file of the same data as stored in another storage tier (e.g., low cost disk storage). In certain embodiments, a set of incoming data is stored in an in-memory data structure in a memory storage facility. The same incoming data is also stored in a log file in a disk storage facility. When an in-memory flush event is detected (e.g., due to a memory size or memory utilization or performance metric threshold breach), the (short-lived) log file is renamed to form a (long-lived) data file. An index file is generated or augmented to comprise keys and pointers to the values of those keys in the data file. In this manner, values of the keys are not copied from location to location. Rather, the index file is augmented to comprise entries by key that merely point to locations in the data file (i.e., the former log file) that comprises the values.

In certain embodiments, the in-memory flush event is based on the storage capacity consumed by the in-memory data structure. The in-memory flush event can also be triggered based on a search latency metric associated with an in-memory data structure. In certain embodiments, a set of maintenance operations (e.g., sort, merge, delete, etc.) can be performed on instances of the on-disk data file and/or the on-disk index file. In certain embodiments, the data set can comprise unstructured data such as key-value pairs that are stored in a binary search tree structure in the in-memory storage tier. Key-value pairs are any combinations of a value (e.g., a string, a number representation, an object, etc.) and a respective identifier, which identifier can be used as a name, a handle, or as an access key.

DEFINITIONS AND USE OF FIGURES

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A illustrates a computing environment 1A00 in which embodiments of the present disclosure can be implemented. As an option, one or more variations of computing environment 1A00 or any aspect thereof may be implemented in the context of the architecture and functionality of the embodiments described herein. The computing environment 1A00 or any aspect thereof may be implemented in any environment.

The embodiment shown in FIG. 1A is merely one example of a computing environment in which the herein disclosed techniques can be implemented. As shown, the computing environment 1A00 comprises a plurality of data sources 110 that generate a stream of data records 118 that are stored in a multi-tier storage facility 170 for access by one or more users (e.g., users 102). As can be observed, data sources 110 can comprise any number and/or variety of data sources such as sensors, wearables, machines, cameras, smartphones, and/or other data sources. In many cases, such various data sources deliver continuous streams of data records (e.g., measurements, observations, transactions, etc.) structured as key-value pairs.

The multi-tier storage facility 170 receives the key-value pairs and stores them in an in-memory storage tier 174 to provide low latency access to the key-value pair data by users 102. As shown, the key-value pairs can be stored in the in-memory storage tier 174 in an in-memory data structure 114 in memory storage 104 to facilitate the low latency access. For example, the key-value pairs might be stored in a binary search tree (BST) structure or a log-structure merge (LSM) tree structure in a set of random access memory (RAM) accessible by the users 102. The received key-values pairs are also often written to a log file (e.g., a commit log file or redo/undo log file) in an on-disk storage tier 172. The log file serves, for example, as a backup of the in-memory key-value pairs in cases when the in-memory data becomes unavailable (e.g., due to a failed system component or service interruption). As shown, the key-value pairs can be stored in the on-disk storage tier 172 in a log file 116 in disk storage 106 (e.g., SSDs, HDDs, etc.). The log file 116 is often structured to efficiently process append-only workloads (e.g., high velocity streams of key-value pairs) such as present in computing environment 1A00.

Still more particularly, the aforementioned log file in the various embodiments are stored in a persistent storage facility. The format of such a log file, and the nature of the persistence is such that, in the event of a power failure or other system failure where the in-memory data is lost, the log file can be accessed to rebuild the in-memory data structure. The log file can be process front to back (e.g., in time-wise forward processing) for rebuilding an in-memory data structure, or a log file can be processed back to front (e.g., in time-wise rewinding processing) for undoing one or more of the most recent commit operations. Operations pertaining to rewinding for undoing one or more of the most recent commit operations can continue iteratively until a previously-reached stable point is restored. A log file can grow almost boundlessly, to the extent of the persistent storage facility, however in many systems the in-memory storage tier is much smaller than the persistent storage facility.

As such, as the number of key-value pairs in the in-memory data structure 114 increases, certain performance metrics associated with the in-memory storage tier 174 may fall below acceptable levels. For example, the amount of memory storage 104 consumed by the in-memory data structure 114 might breach some predetermined memory size or memory utilization threshold. As another example, the depth or breadth of a BST or LSM tree might grow to an extent that reduces the search efficiency (e.g., access latency) of the tree below some acceptable threshold.

Figure 1B:
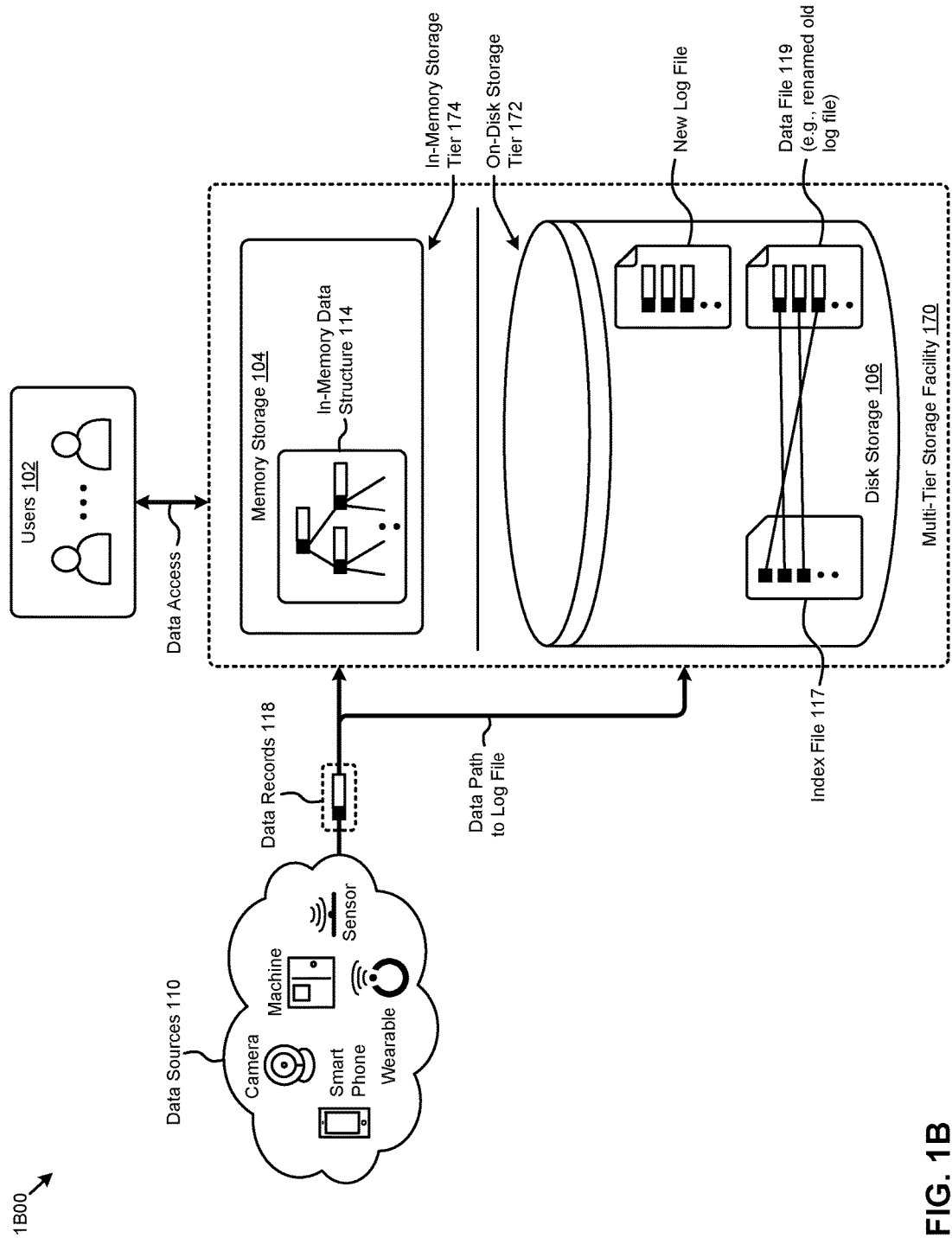

FIG. 1B depicts the computing environment 1B00 at a time later than as depicted in FIG. 1A. Specifically, FIG. 1B shows an index file 117 that relates keys in the index to data found in data file 119. The data file 119 has the same contents as the aforementioned log file. More specifically, the data file 119 is the same file (e.g., same contents, same blocks, same location, etc.) as the log file 116 except that the file name has been changed. Renaming a log file to become a data file has the characteristic that data is not moved in the renaming operation. In this manner, keys and values that were recorded in the log file 116 can be accessed from an index file 117, as shown, without creating a new file container and copying data from the log file to the newly-created file container. In cases of large log files, this saves significant computing resources. Also, in cases where key-value pairs are being added at a high rate, this improves the average rate of key-value processing by avoiding the computing resources involved in copying data from one storage location to another storage location.

Figure 2:
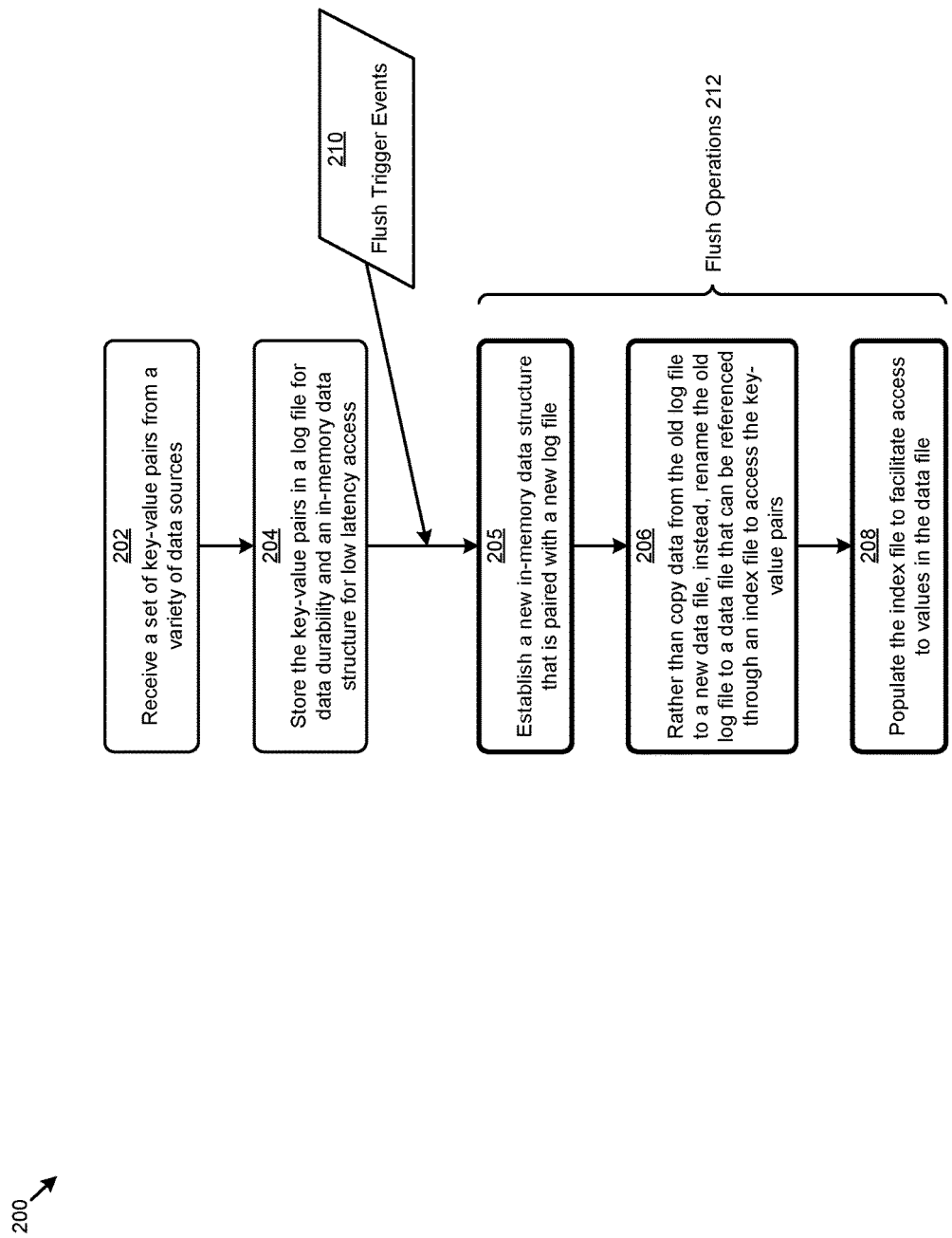
FIG. 2 depicts a log file repurposing technique used when purging key-value pairs from an in-memory storage tier to an on-disk storage tier, according to some embodiments.

One embodiment of the herein disclosed techniques for efficiently managing access and durability of large volumes of key-value pairs while observing characteristics and limitations of the multi-tier storage facilities is shown and described as pertaining to FIG. 2.

FIG. 2 depicts a log file repurposing technique 200 used when purging key-value pairs from an in-memory storage tier to an on-disk storage tier. As an option, one or more variations of log file repurposing technique 200 or any aspect thereof may be implemented in the context of the architecture and functionality of the embodiments described herein. The log file repurposing technique 200 or any aspect thereof may be implemented in any environment.

As earlier mentioned, the key-value pairs in an in-memory storage tier may grow to a level that triggers some action to be taken on in-memory data. For example, a breach of a storage capacity utilization threshold or a search latency threshold might invoke an in-memory flush event. Such a flush or purge of the then-current in-memory storage of key-value pairs serves to reclaim the storage capacity and/or the search efficiency of the in-memory storage tier.

The herein disclosed techniques can facilitate an in-memory data flush as depicted in log file repurposing technique 200. Specifically, log file repurposing technique 200 can commence with receiving a set of key-value pairs from a variety of data sources (step 202). The key-value pairs are stored in a log file (e.g., on disk) for data durability (e.g., data availability) compliance, and stored in an in-memory data structure for low latency access (step 204). When one or more occurrences of in-memory flush events 210 are detected, a set of in-memory flush operations (grouping 212) are initiated. As earlier mentioned, such in-memory flush events can be triggered by a breach of a memory size utilization threshold and/or a performance metric (e.g., access latency) threshold. In other cases, in-memory flush events might be triggered by the release (e.g., after a certain time period) of the dynamically-configurable memory (e.g., loanable memory, balloon memory, etc.) comprising the in-memory data structure holding the key-value pairs.

The in-memory flush operations can commence, for example, by establishing a new in-memory data structure that is paired with a newly-created log file (step 205). The new in-memory data structure and associated new log file are established to continue receiving the high velocity of key-value pairs without interruption concurrently with the in-memory flush. In many cases, the transition from the then-current in-memory data structure and log file to the newly established in-memory data structure and newly-created log file is performed using various atomic operations and/or structures (e.g., locks, semaphores, compare-and-swap operations, etc.). According to the herein disclosed techniques, the then-current set of in-memory key-value pairs are then flushed from the in-memory data structure by renaming the active log file to a data file that can be referenced (e.g., through an index) to access at least the values of the key-value pairs (step 206). As shown, this step 206 can be accomplished by a renaming operation. Specifically, rather than copying data from the old log file to a new data file, instead, the old log file is renamed to a data file that can be referenced through an index file to access the key-value pairs that had been stored in the old log file (and are present in the newly-named data file). The index file can then be modified to hold keys and pointers to the key-value pairs that had been stored in the old log file (and are present in the newly-named data file).

In some embodiments, and as shown, an index or index file is a collection of interrelated data entries such as keys that facilitate access to portions of the data file where the values corresponding to the keys are stored (step 208). In some cases the contents of the in-memory data structure are processed to populate the index file. In some cases the contents of the data file is processed to populate the index file.

In certain embodiments, the in-memory data structure comprises keys and values originating from different sources, and/or keys and values that are destined for different on-disk destinations. In such cases, the key-value pairs in the in-memory data structure comprise heterogeneous key-value pairs where one type pertains to a first source or destination, and a second type pertains to a second source or destination. In such cases of heterogeneous key-value pairs, multiple log files might be maintained where the several log files pertain to respective sources, destinations or key-value types. More particularly, when different log files are used for respective different sources or destinations, one particular first set of flush criteria may apply to a first set of key-value pairs (e.g., to a first red log file), and a second set of flush criteria can apply to a second log file.

Figure 3:
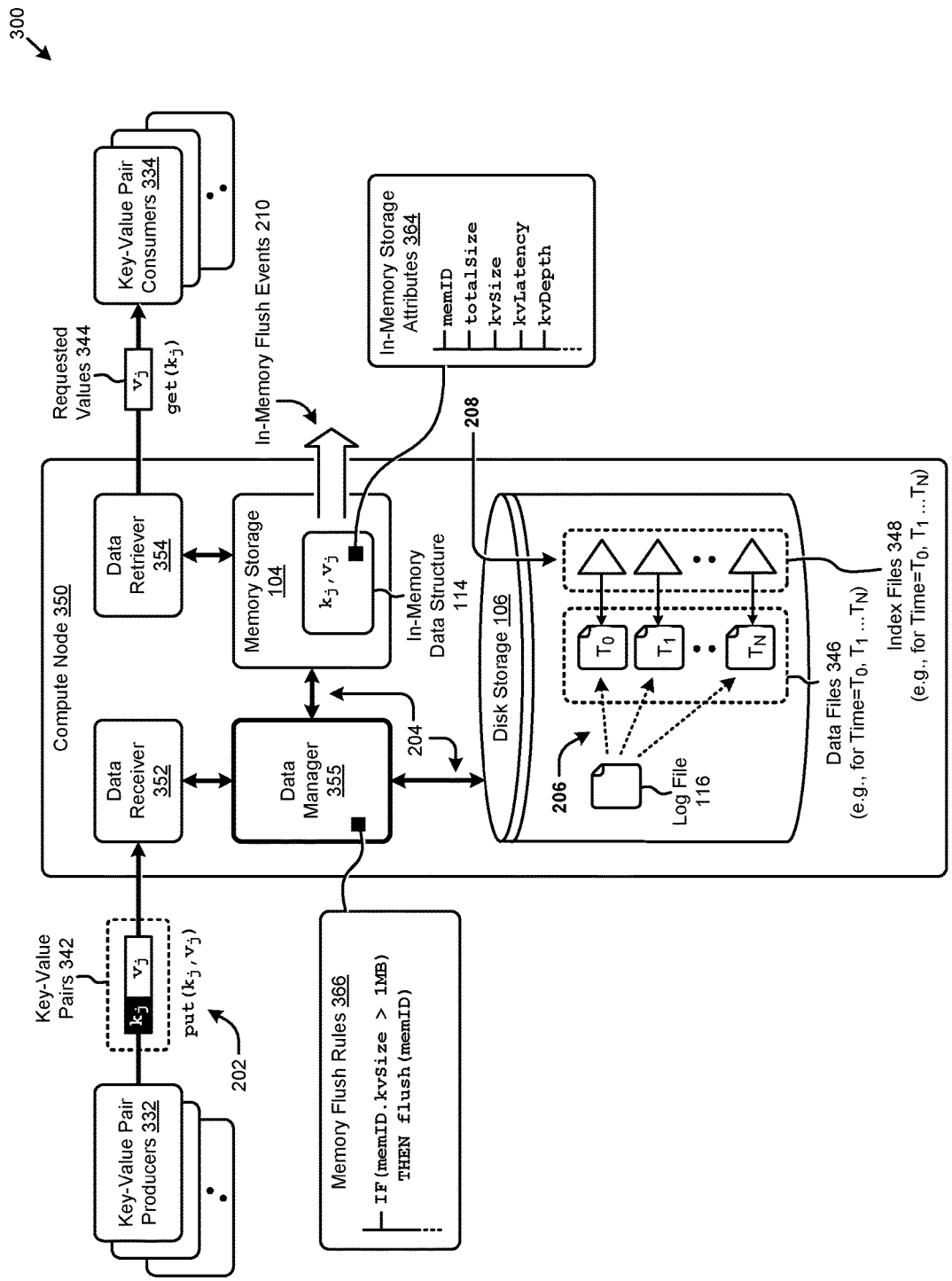
FIG. 3 presents a data flow that implements log file repurposing when purging key-value pairs from an in-memory storage tier to an on-disk storage tier, according to an embodiment.

One embodiment of system components and data flows for implementing the herein disclosed techniques is shown and described as pertaining to FIG. 3.

FIG. 3 presents a data flow 300 that implements log file repurposing when purging key-value pairs from an in-memory storage tier to an on-disk storage tier. As an option, one or more variations of data flow 300 or any aspect thereof may be implemented in the context of the architecture and functionality of the embodiments described herein. The data flow 300 or any aspect thereof may be implemented in any environment.

The shown data flow 300 presents various representative interactions between a set of system components to illustrate the herein disclosed techniques for repurposing a log file to purge in-memory key-value pairs to on-disk storage. Specifically, a representative instance of a compute node 350 is shown comprising a data receiver 352, a data retriever 354, and a data manager 355. Compute node 350 further comprises an instance of memory storage 104 and disk storage 106 earlier described. The data receiver 352 receives instances of key-value pairs 342 (e.g., "$k_j$, $v_j$") from a plurality of key-value pair producers 332 (step 202 from FIG. 2). For example, the key-value pairs might be received in a "put ($k_j$, $v_j$)" command issued by the key-value pair producers 332. Data manager 355 stores the key-value pairs received by data receiver 352 in an instance of a log file 116 in the disk storage 106 at compute node 350 (step 204 from FIG. 2). Data manager 355 also stores the received key-value pairs in an instance of an in-memory data structure 114 in the memory storage 104 at compute node 350 (step 204 from FIG. 2). A set of key-value pair consumers 334 access various instances of requested values 344 from the key-value pairs in memory storage 104 through the data retriever 354. As an example, a value (e.g., "$v_j$") associated with a respective key (e.g., "$k_j$") in a given key-value pair might be retrieved in a "get ($k_j$)" command issued by the key-value pair consumers 334.

At certain moments in time, instances of in-memory flush events 210 are detected. For example, one or more in-memory storage attributes 364 might be applied to a set of memory flush rules 366 at data manager 355 to invoke one or more in-memory flush events 210. In some cases, the in-memory storage attributes 364 comprise measured characteristics of the in-memory data structure 114 and/or memory storage 104 provided by a system monitor agent at compute node 350.

The in-memory storage attributes 364 are often organized and/or stored in a tabular structure (e.g., relational database table). Such tabular structures might have rows corresponding to a particular memory storage facility and columns corresponding to various attributes pertaining to that memory storage facility. For example, as depicted in the in-memory storage attributes 364, a table row might describe a "memID" of a given memory storage facility, a total size or "totalSize" of the memory storage facility, a key-value store size or "kvSize", a key-value search latency or "kvLatency", a key-value store tree depth or "kvDepth", and/or other attributes of the memory storage facility. A set of rules (e.g., rule base) such as memory flush rules 366 comprises data records storing various information that can be used to form one or more constraints to apply to certain functions and/or operations. For example, the information pertaining to a rule in the rule base might comprise the conditional logic operands (e.g., input variables, constraints, thresholds, etc.) and/or operators (e.g., "if", "then", "and", "or", "greater than", "less than", etc.) for forming a conditional logic statement that returns one or more results. For example, as depicted in the shown example rule pseudo-code in FIG. 3, one rule might invoke an in-memory flush event when the key-value store size (e.g., "kvSize") exceeds "1 MB".

According to the herein disclosed techniques, when an in-memory flush event is detected, the log file 116 is renamed to an instance of a data file (step 206 from FIG. 2). As can be observed, multiple instances (e.g., levels, generations, etc.) of data files 346 derived from log files renamed at various moments in time (e.g., Time=$T_0, T_1, \ldots, T_N$) can be present in disk storage 106. Also, at various moments in time (e.g., Time=$T_0, T_1, \ldots, T_N$) one or more index files 348 are populated to facilitate access to the data files 346 (step 208 from FIG. 2). In many cases, the contents of the in-memory data structure 114 that is being flushed is organized to efficiently be used to populate the index file.

The components and data flows shown in FIG. 3 present merely one partitioning and associated data manipulation approach. The specific example shown is purely exemplary, and other subsystems and/or partitioning are reasonable. One embodiment depicting further details of the herein disclosed techniques for flushing or purging data records from one storage tier to a data file of another storage tier by repurposing an existing log file is presented and discussed as pertains to FIG. 4.

Figure 4:
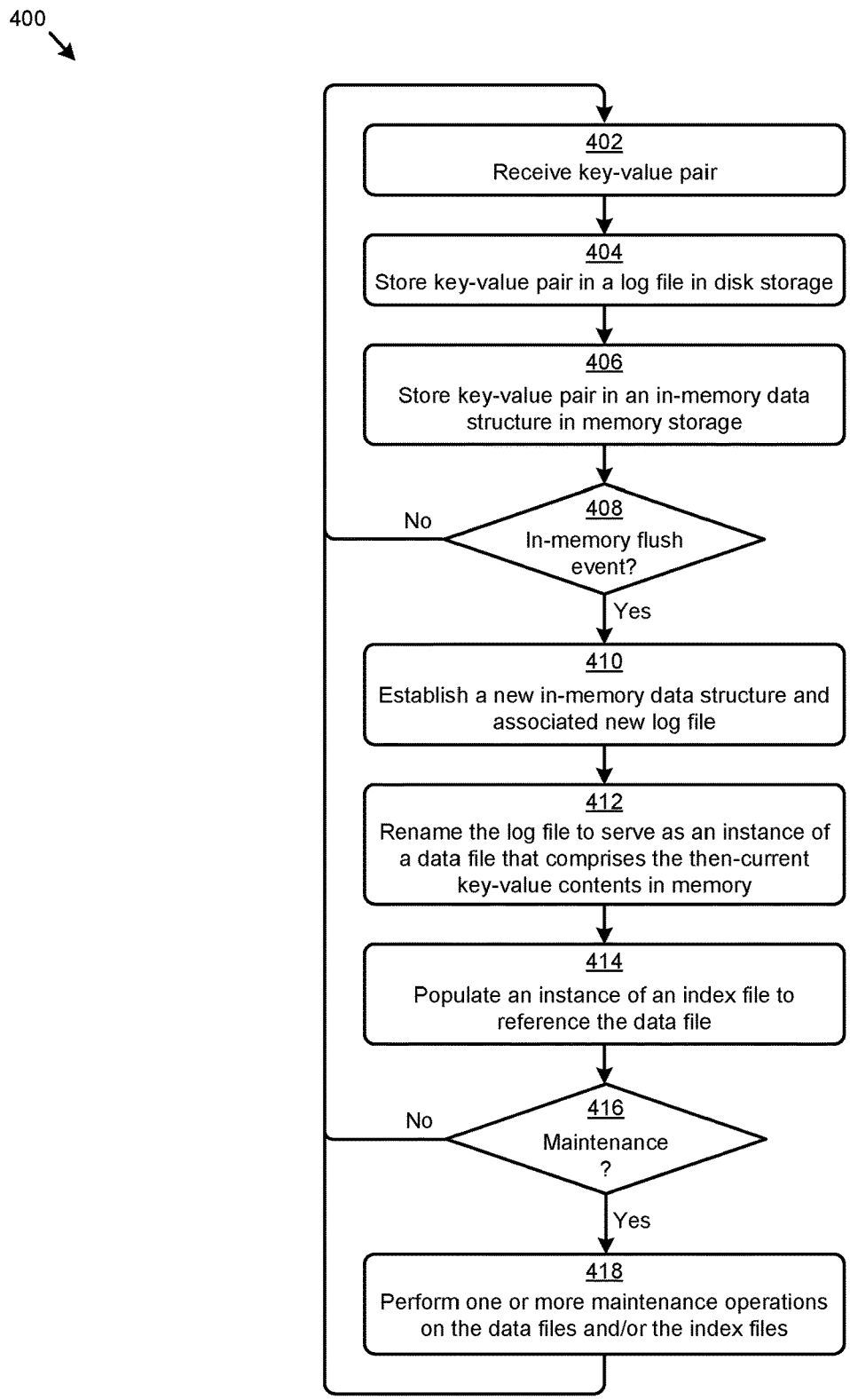
FIG. 4 depicts a data purging technique as implemented in systems that perform log file repurposing when purging key-value pairs from an in-memory storage tier to an on-disk storage tier, according to an embodiment.

FIG. 4 depicts a data purging technique 400 as implemented in systems that perform log file repurposing when purging key-value pairs from an in-memory storage tier to an on-disk storage tier. As an option, one or more variations of data purging technique 400 or any aspect thereof may be implemented in the context of the architecture and functionality of the embodiments described herein. The data purging technique 400 or any aspect thereof may be implemented in any environment.

The data purging technique 400 presents one embodiment of certain steps and/or operations that facilitate a purge of key-value pairs from an in-memory storage tier to an on-disk storage tier by, in part, repurposing a log file. The data purging technique 400 can commence by receiving a key-value pair (step 402). The key-value pair is stored in a log file in disk storage in, for example, an on-disk storage tier (step 404). The key-value pair is also stored in an in-memory data structure (step 406). For example, upon receiving a commit confirmation associated with the on-disk storage operation, the key-value pair might be placed in a BST in an in-memory storage tier that facilitates low latency access to the key-value pair. As can be observed, key-value pairs are continually received and stored (see "No" path of decision 408) until an in-memory flush event is detected.

When an in-memory flush event is detected (see "Yes" path of decision 408), a new in-memory data structure and associated new log file are established to begin receiving the incoming key-value pairs (step 410). For example, a new in-memory data structure might be established by creating a table of "type=BST" with a new root node corresponding to the next received key-value pair. The new log file might be established by creating a table in on-disk storage. The log file associated with the in-memory data structure that is being flushed is renamed to an instance of a data file that comprises the then-current key-value contents in the in-memory data structure (step 412). An instance of an index file (e.g., new index file or existing index file) is populated so as to facilitate access to the data file (step 414).

Over time, various instances (e.g., levels, generations, etc.) of the data files and/or index files can be concurrently present. In some cases, the aforementioned maintenance operations (e.g., merge, sort, compact, compress, etc.) might be desired to improve storage efficiency, access efficiency, and/or other efficiencies. If no maintenance of these files is desired in response to the newly created and/or updated data file and/or index file (see "No" path of decision 416), then the data purging technique 400 continues to execute as earlier described. If maintenance is indicated (see "Yes" path of decision 416), then one or more maintenance operations are performed on one or more of the data files and/or index files (step 418). In many cases, such maintenance operations can be performed asynchronously (e.g., at a lower frequency) to the other steps and/or operations of data purging technique 400.

As earlier described, the in-memory data structure in the in-memory storage tier is often organized to facilitate low latency access to the stored key-value pairs. One example of an in-memory data structure is shown and described as pertaining to FIG. 5A.

Figure 5A:
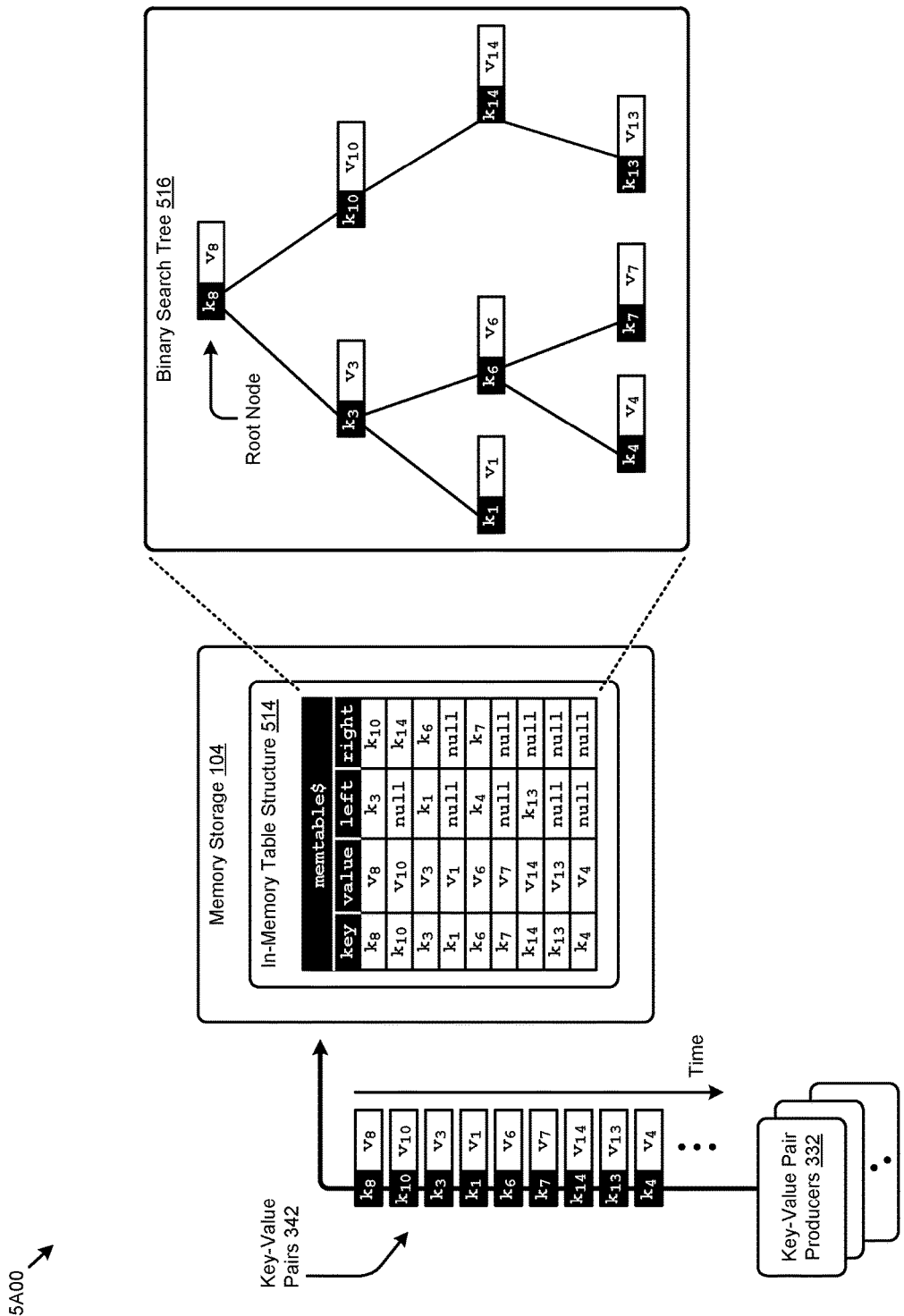
FIG. 5A is a diagrammatic representation of in-memory storage data structures used in systems for purging key-value pairs from an in-memory storage tier to an on-disk storage tier, according to an embodiment.

FIG. 5A is a diagrammatic representation of in-memory storage data structures 5A00 used in systems for purging key-value pairs from an in-memory storage tier to an on-disk storage tier. As an option, one or more variations of in-memory storage data structures 5A00 or any aspect thereof may be implemented in the context of the architecture and functionality of the embodiments described herein. The in-memory storage data structures 5A00 or any aspect thereof may be implemented in any environment.

The embodiment shown in FIG. 5A is merely one example of a set of specialized data structures that are designed to improve the way a computer stores and retrieves data in memory when performing the herein disclosed techniques. Specifically, as shown, the key-value pairs 342 received from key-value pair producers 332 are organized and stored in an in-memory tabular structure 514 in memory storage 104 that forms a logical structure represented by binary search tree 516. Such binary search trees (BSTs) organize the keys of the key-value pairs in a sorted order so that key lookup, received key placement, and/or other operations can be implemented using a binary search technique. Specifically, for example, when searching for a key in a BST or placing a new key in a BST, the tree is traversed from the root node to leaf nodes and a comparison of the subject key to the key stored at a then-current node is performed. A decision is then made, based on the comparison, to continue the search in the left or right subtrees. In this case, even when keys are received out of order over time (e.g., "$k_8$", "$k_{10}$", "$k_3$", "$k_1$", etc.) the average time to perform operations on the BST is proportional to the logarithm of the number of items stored in the BST (e.g., as compared to being proportional to the number of items in an unsorted array). The binary search tree 516 is a tree of depth 3 with key "$k_8$" at the root node.

As shown, the in-memory tabular structure 514 (e.g., "memTable$") stores data characterizing the contents and logical structure of binary search tree 516 using rows corresponding to a particular key and columns corresponding to various attributes pertaining to that key. For example, as depicted in the in-memory tabular structure 514, a table row for a subject "key" might describe a "value" associated with the key, the key to the "left" of the subject key in the tree, the key to the "right" of the subject key in the tree, and/or other attributes associated with the subject key. As can be observed, when no key exists in a "left" or "right" branch of the subject key, a "null" attribute is entered in the respective field. The attributes stored in memTable$ can be consumed by a search agent to traverse the binary search tree 516 using the earlier described search techniques.

The embodiment shown in FIG. 5A is merely one example. Other in-memory data structures (e.g., LSM tree, etc.) are possible. Various structures for storing and/or organizing the on-disk data when implementing the herein disclosed techniques are also possible. Examples of such on-disk data structures are shown and described as pertaining to FIG. 5B.

Figure 5B:
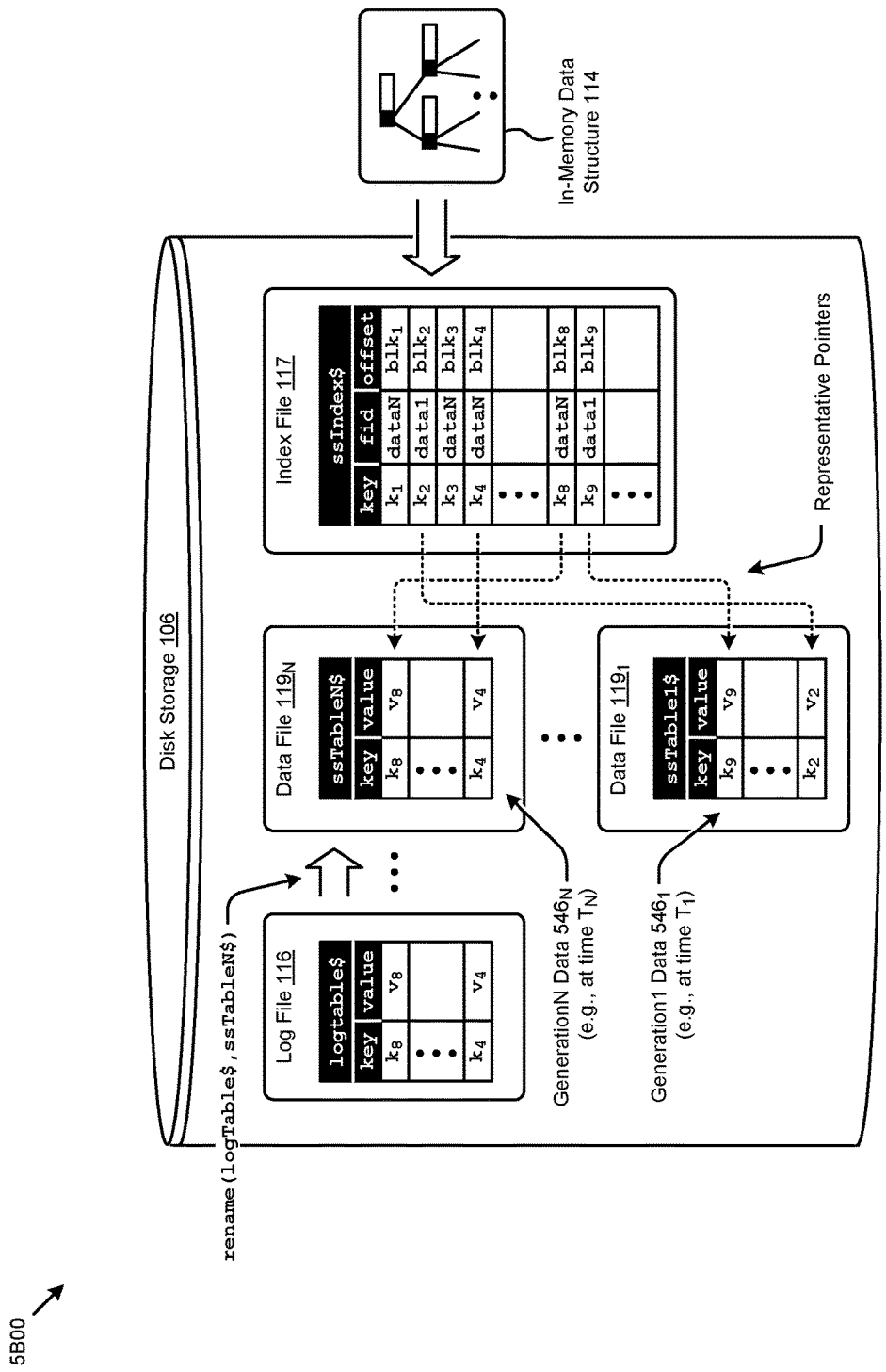
FIG. 5B is an illustration of disk storage data structures used in systems that perform log file repurposing when purging key-value pairs from an in-memory storage tier to an on-disk storage tier, according to an embodiment.

FIG. 5B is an illustration of disk storage data structures 5B00 used in systems that perform log file repurposing when purging key-value pairs from an in-memory storage tier to an on-disk storage tier. As an option, one or more variations of disk storage data structures 5B00 or any aspect thereof may be implemented in the context of the architecture and functionality of the embodiments described herein. The disk storage data structures 5B00 or any aspect thereof may be implemented in any environment.

The embodiment shown in FIG. 5B is merely one example of a set of specialized data structures that are designed to improve the way a computer stores and retrieves data in memory when performing the herein disclosed techniques. As shown, the log file 116 is stored in disk storage 106 in a tabular form. Specifically, the log file 116 comprises a table "logTable$" having rows corresponding to each logged "key" and "value" pair. According to the herein disclosed techniques, when an in-memory flush event occurs, the log file 116 is renamed to an instance of a data file. For example, "logTable$" might be renamed to "s sTableN$" (e.g., data file $119_N$) using the command "rename (logTable$, ssTableN$)".

As can be observed, log file 116 and data file $119_N$ share a common data structure in accordance with the herein disclosed techniques. As further shown, multiple instances of data files renamed from respective instances of log files might coexist in disk storage 106. For example, the instances of data files might correspond to respective generations of data (e.g., generation1 data $546_1$, . . . , generationN data $546_N$) comprising the then-current key-value pair in the log file at certain moments in time (e.g., $T_1$, . . . , $T_N$). In this example, data file $119_1$ corresponds to a data file renamed from a log file at time $T_1$, and data file $119_N$ corresponds to a data filed renamed from a log file at time $T_N$.

In some cases, each of the aforementioned data files might have a corresponding index file that is used to access a respective data file. In other cases, as shown, one instance of an index file 117 references all instances of the data files. In these cases, the index file 117 can comprise a table (e.g., "ssIndex$") having rows associated with a given key and columns describing attributes associated with a respective key. Specifically, each row might have columns that describe a "key", a file identifier or "fid", a block offset or "offset", and/or other attributes. The "fid" and "offset" are used to locate the "value" corresponding to the "key" in the data files. As can be observed, the keys in the index file 117 can be sorted (e.g., upon population and/or during maintenance operations) to facilitate efficient search operations and/or efficient storage. A set of representative pointers illustrate the mapping of the keys in the index file 117 to the corresponding values in the data files.

As further illustrated in FIG. 5B, the index file or files can be populated using the then-current information contained in the in-memory data structure 114. In certain embodiments, for example, the in-memory data structure 114 might comprise pointers to the key-value pairs on disk storage that can be efficiently transferred to an on-disk index file. Such an embodiment is presented and discussed as pertains to FIG. 6A.

Figure 6A:
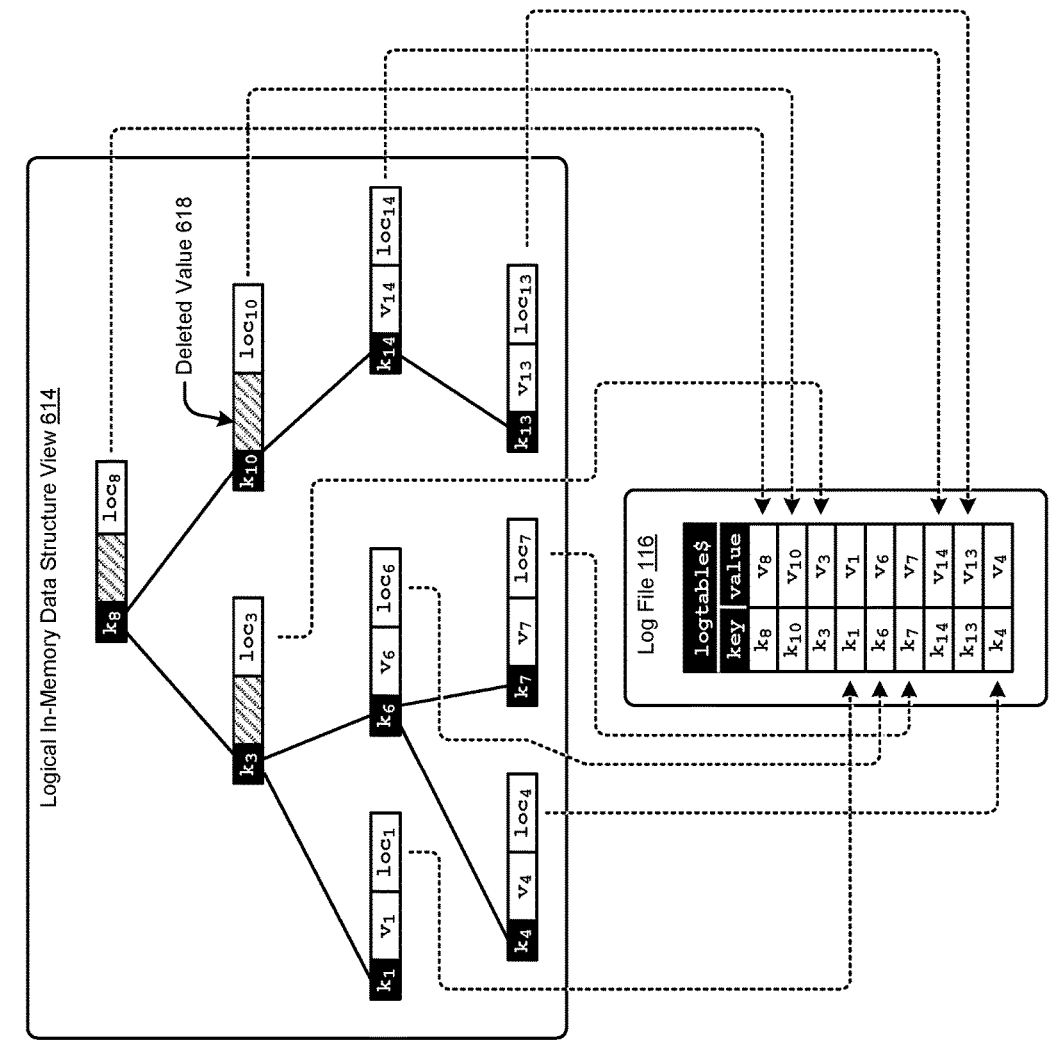
FIG. 6A depicts an illustration of an in-memory value reference technique as used in systems that perform log file repurposing when purging key-value pairs from an in-memory storage tier to an on-disk storage tier, according to an embodiment.
Figure 6A:
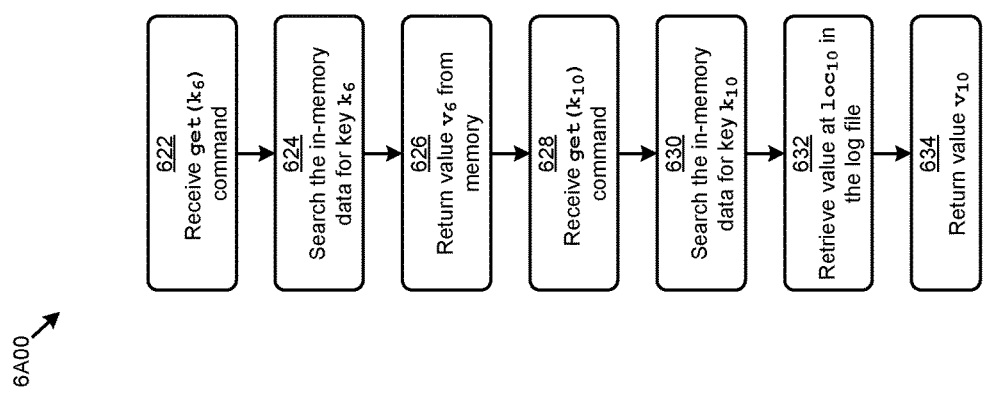

FIG. 6A depicts an illustration of an in-memory value reference technique 6A00 as used in systems that perform log file repurposing when purging key-value pairs from an in-memory storage tier to an on-disk storage tier. As an option, one or more variations of an in-memory value reference technique 6A00 or any aspect thereof may be implemented in the context of the architecture and functionality of the embodiments described herein. The in-memory value reference technique 6A00 or any aspect thereof may be implemented in any environment.

The embodiment in FIG. 6A depicts a logical in-memory data structure view 614 that shows a set of keys organized in a tree-like structure (e.g., BST, LSM tree, etc.), and a corresponding value and/or value storage location (e.g., value reference) associated with the keys. To build this structure, the received key-value pairs are organized and stored according to the in-memory data structure as earlier described. However, in this embodiment, the location of the value stored in the on-disk log file is also associated with the key in the in-memory data structure. This facilitates deletion of certain values (e.g., deleted value 618) from in-memory storage when, for example, storing the value consumes more in-memory storage capacity as compared to storing the value location, or when the value is infrequently accessed (e.g., "cold" data), or when other conditions are present. Moreover, given a facility to delete certain values or types of values from in-memory storage (e.g., while replacing the deleted value with a pointer to a value instead), it is possible to implement various policies that explicitly evict only certain types of values from memory without flushing or evicting all values from the in-memory data structure.

By implementing one or more of the foregoing techniques, a requested value can be retrieved from the in-memory store or the on-disk store. For example, as shown in the flow diagram in FIG. 6A, a "get ($k_6$)" command might be received (step 622). The in-memory data is searched for key "$k_6$" (step 624). For example, the tree illustrated in the logical in-memory data structure view 614 is traversed to find key "$k_6$". When key "$k_6$" is found, the value "$v_6$" also stored in-memory is returned (step 626). In another case, a "get ($k_{10}$)" command is received (step 628). The in-memory data is searched for key "$k_{10}$" (step 630). When key "$k_{10}$" is found, there is no associated in-memory value, so the value at "$loc_{10}$" in the log file is retrieved (step 632) and returned (step 634).

The keys received and stored in-memory and on-disk are often unique, and in many cases, ordered. In some cases, however, multiple key-value pairs associated with a given key might be received. A technique for handling such duplicate keys is shown and described as pertaining to FIG. 6B.

Figure 6B:
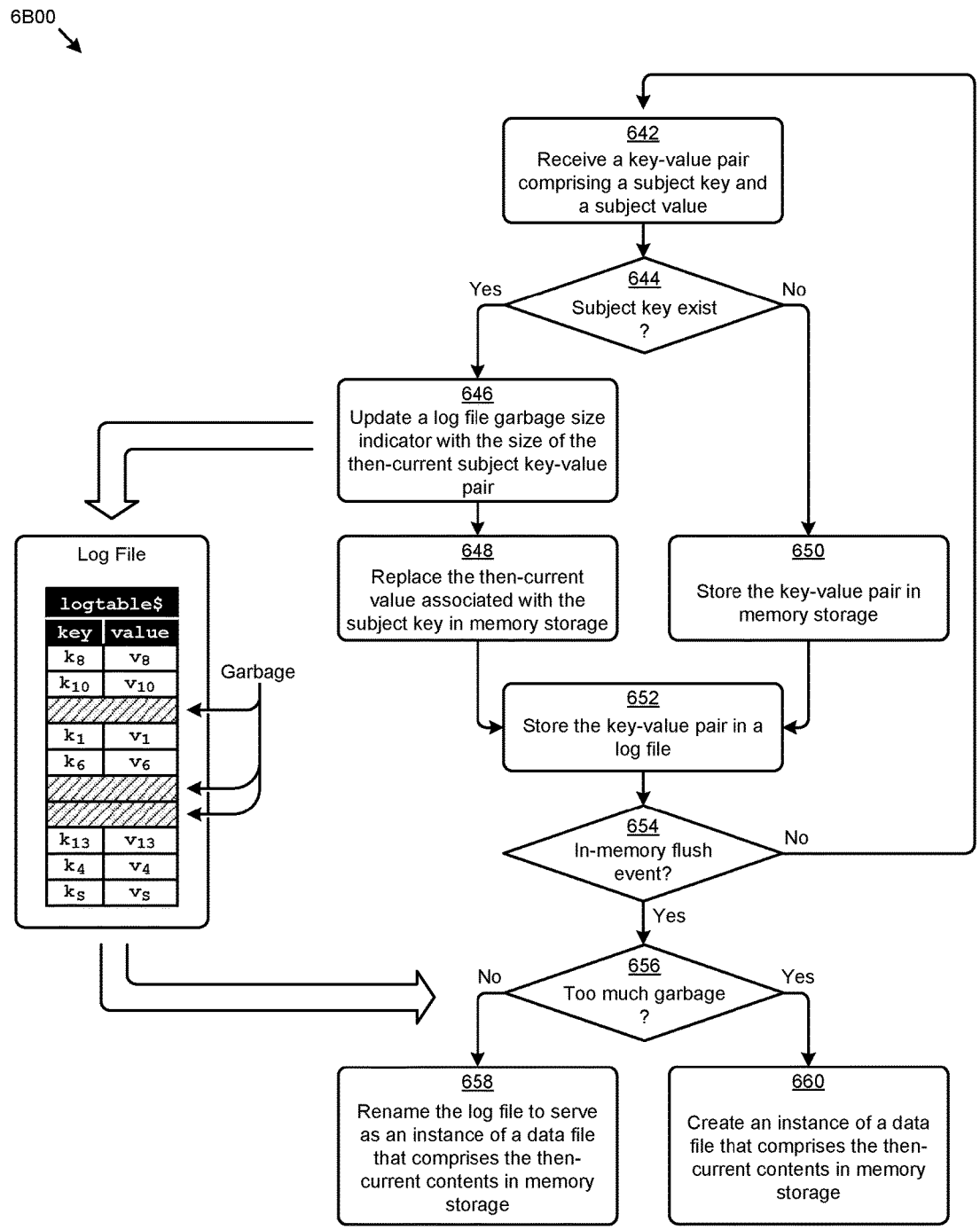
FIG. 6B presents a garbage tracking technique as used in systems that perform log file repurposing when purging key-value pairs from an in-memory storage tier to an on-disk storage tier, according to an embodiment.

FIG. 6B presents a garbage tracking technique 6B00 as used in systems that perform log file repurposing when purging key-value pairs from an in-memory storage tier to an on-disk storage tier. As an option, one or more variations of garbage tracking technique 6B00 or any aspect thereof may be implemented in the context of the architecture and functionality of the embodiments described herein. The garbage tracking technique 6B00 or any aspect thereof may be implemented in any environment.

The garbage tracking technique 6B00 presents one embodiment of certain steps and/or operations that account for duplicate keys when purging key-value pairs from an in-memory storage tier to an on-disk storage tier. The garbage tracking technique 6B00 can commence by receiving a key-value pair comprising a subject key (e.g., "$k_s$") and a subject value (step 642). If the subject key does not exist (see "No" path of decision 644), the key-value pair is stored in memory storage according to any of the techniques herein disclosed (step 650). If the subject key exists (see "Yes" path of decision 644), a log file garbage size metric is increased by the size of the then-current key-value pair associated with the subject key (step 646). For example, a metric characterizing the size of the garbage might be updated using the command "garbageSize+=size (logTable$.get($k_s$))". The then-current value in memory storage associated with the subject key is replaced with the received subject value (step 648). The received key-value pair is then stored in (e.g., appended to) the log file (step 652).

When an in-memory flush event is detected (see "Yes" path of decision 654), the log file is analyzed to determine an indication of the amount of garbage contained in the file, otherwise, processing returns to step 642 (see "No" path of decision 654). At moments in time when or after an in-memory flush event has been detected, a "garbageSize" metric might be compared to the total size of the log file to determine a percentage of garbage in the file. If the percentage of garbage exceeds some predetermined threshold (e.g., 50%) to indicate too much garbage (see "Yes" path of decision 656), then an instance of a data file is created to store the then-current contents (e.g., key-value pairs) of the in-memory storage (step 660). If the log file is determined to have an acceptable amount of garbage (see "No" path of decision 656), then the log file is renamed to serve as a data file representing the then-current contents of the in-memory storage (step 658).

As described herein, various maintenance operations might be performed on the data files and/or the index files stored on-disk to improve performance and/or to accomplish other objectives. One technique for addressing such maintenance operations is presented and discussed as pertains to FIG. 6C.

Figure 6C:
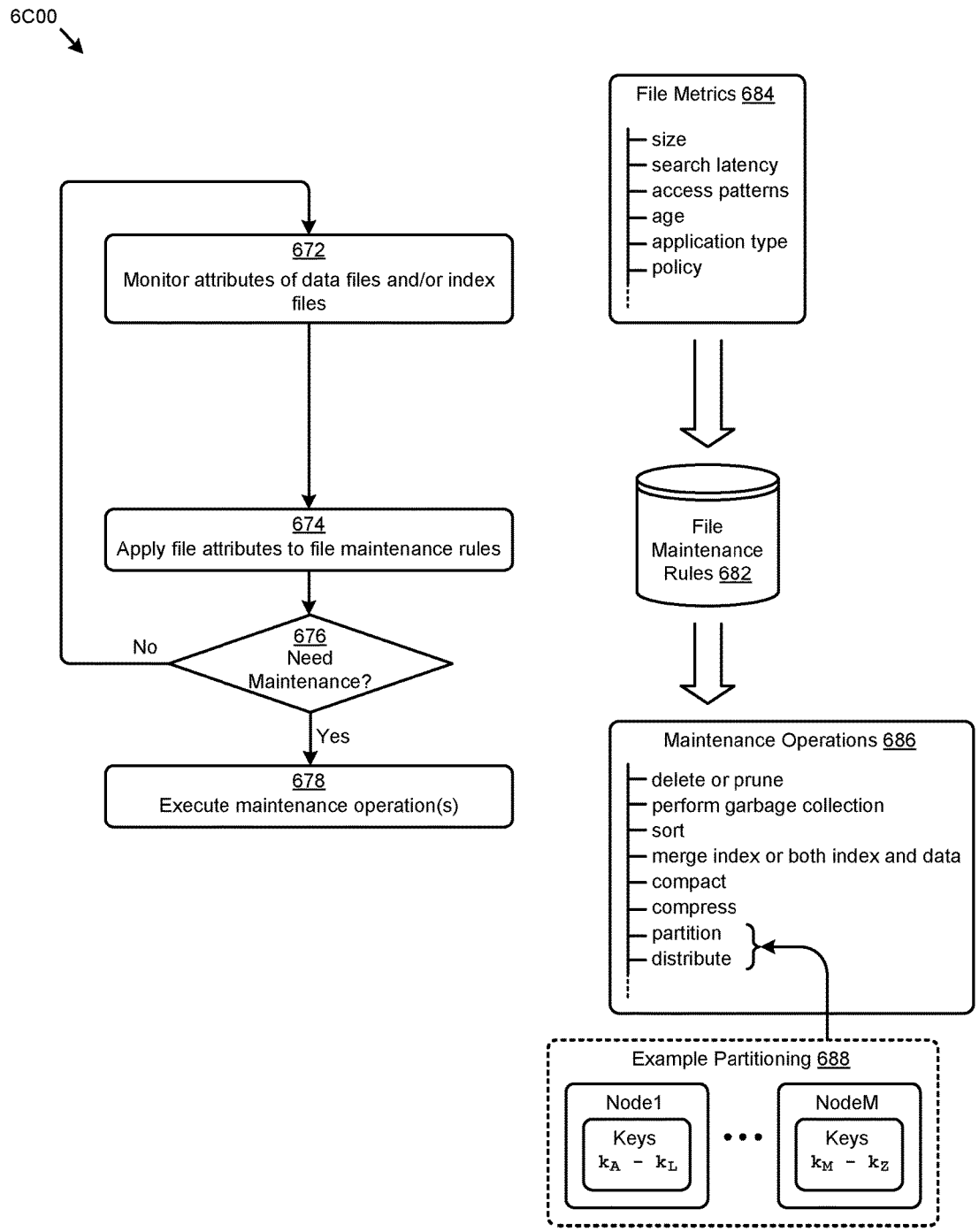
FIG. 6C illustrates data maintenance techniques as used in systems that perform log file repurposing when purging key-value pairs from an in-memory storage tier to an on-disk storage tier, according to an embodiment.

FIG. 6C illustrates data maintenance techniques 6C00 as used in systems that perform log file repurposing when purging key-value pairs from an in-memory storage tier to an on-disk storage tier. As an option, one or more variations of data maintenance techniques 6C00 or any aspect thereof may be implemented in the context of the architecture and functionality of the embodiments described herein. The data maintenance techniques 6C00 or any aspect thereof may be implemented in any environment.

The shown data maintenance techniques present merely one embodiment of certain steps and/or operations that facilitate ongoing maintenance of the data files and/or index files. Strictly as examples, such maintenance operations might include purging key-value pairs from an in-memory storage tier to an on-disk storage tier. The shown data maintenance technique can commence by monitoring certain attributes of the data files and/or index files (step 672). For example, the attributes might correspond to a set of metrics that are measured periodically by a system monitoring agent. As illustrated by the file metrics 684, such metrics might characterize a file "size", a file "search latency", file "access patterns", a file "age", an "application type", a data management "policy" (e.g., a security policy, an availability policy, a durability policy, a retention policy, etc.), and/or other attributes. For example, some application types might expect that all key-value pairs are retained in perpetuity (e.g., never become garbage and/or are never subjected to "clean-up" or other operations that would delete or purge the key-value pairs). In other cases, earlier received key-value pairs that have become cold might be removed from certain storage tiers, and retained only in certain other storage tiers (e.g., in a low cost cloud storage tier).

The collected attributes can be applied to a set of file maintenance rules (e.g., file maintenance rules 682) to determine any maintenance actions to be performed (step 674). If no maintenance actions are to be taken (see "No" path of decision 676), the monitoring of the files continues. If maintenance actions are identified (see "Yes" path of decision 676), the maintenance operations specified by the file maintenance rules 682 are executed (step 678). For example, a "delete" operation might be executed on an instance of a data file having an age that has surpassed a certain age threshold. As shown in the set of maintenance operations 686, the set of operations invoked by data maintenance technique 6C00 might include a delete or prune operation, a garbage collection operation, a sort operation, a merge operation (e.g., to merge keys in an index or to merge both index and keys, etc.), a compaction operation, and/or a compression operation.

In certain computing and storage environments, a partition operation (e.g., sharding) and/or any form or forms of distribute operations can be performed on the data comprising the data structures and/or files to partition and/or distribute the data across multiple physical and/or logical domains. For example, it might be determined that a merged data file has reached or surpassed a size threshold. In such a case, and as in the shown partitioning 688, a partition comprising keys "$k_A$" to "$k_L$" of a corpus of key-value pairs might be assigned to "node1" (e.g., a node in a computing cluster), while a partition comprising keys "$k_M$" to "$k_Z$" might be assigned to a different node "nodeM" (e.g., assigned to another a node in the computing cluster).

Figure 7:
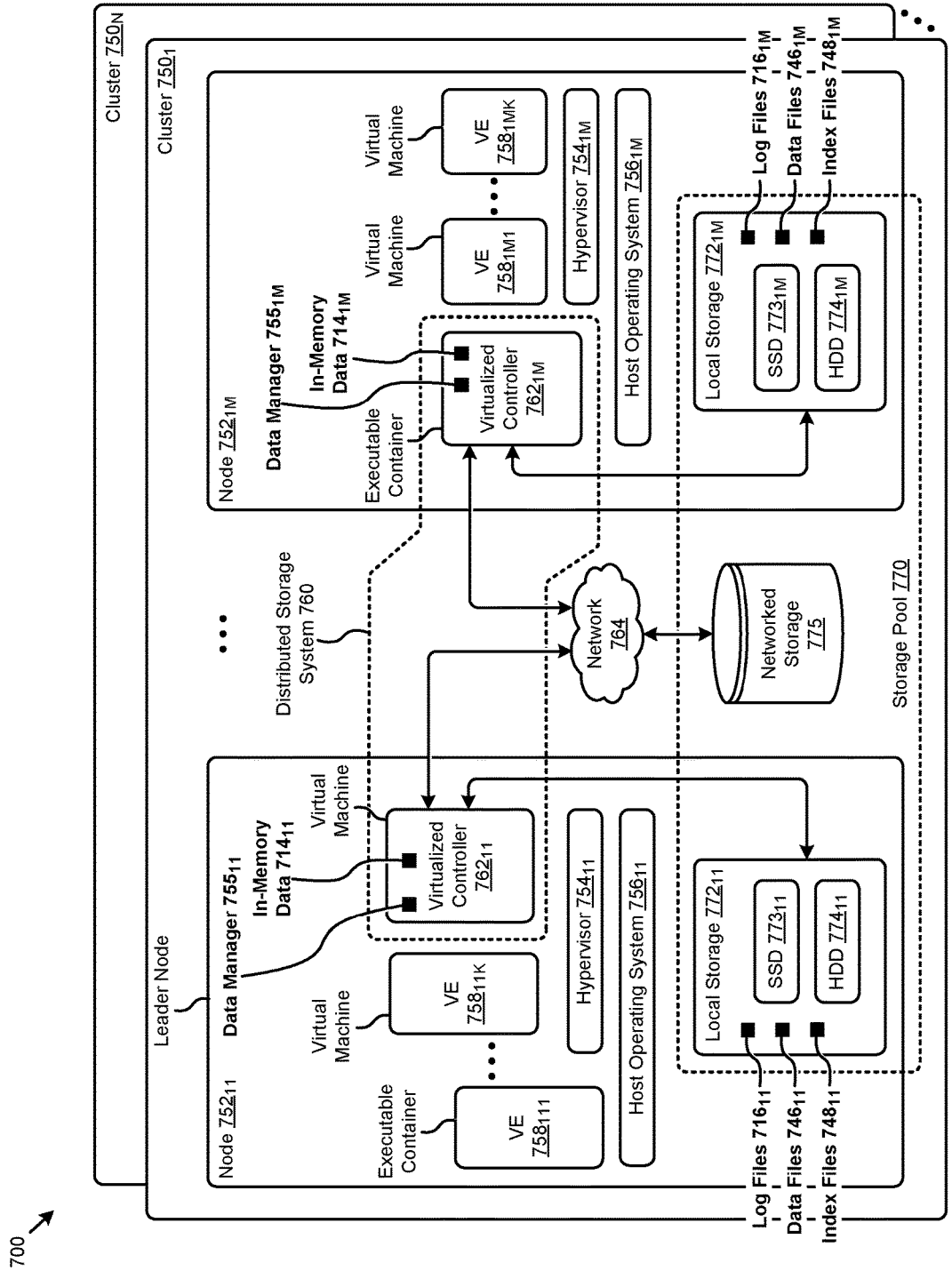
FIG. 7 presents a distributed virtualization environment in which embodiments of the present disclosure can operate, according to some embodiments.

An example architecture showing such distributed nodes in a distributed virtualization environment (e.g., distributed computing environment, hyperconverged distributed computing environment, etc.) is presented and discussed as pertains to FIG. 7.

FIG. 7 presents a distributed virtualization environment 700 in which embodiments of the present disclosure can operate. As an option, one or more variations of distributed virtualization environment 700 or any aspect thereof may be implemented in the context of the architecture and functionality of the embodiments described herein. The distributed virtualization environment 700 or any aspect thereof may be implemented in any environment.

The shown distributed virtualization environment depicts various components associated with one instance of a distributed virtualization system (e.g., hyperconverged distributed system) comprising a distributed storage system 760 that can be used to implement the herein disclosed techniques. Specifically, the distributed virtualization environment 700 comprises multiple clusters (e.g., cluster $750_1, \ldots,$ cluster $750_N$) comprising multiple nodes that have multiple tiers of storage in a storage pool. Representative nodes (e.g., node $752_{11}, \ldots,$ node $752_{1M}$) and storage pool 770 associated with cluster $750_1$ are shown. Each node can be associated with one server, multiple servers, or portions of a server. The nodes can be associated (e.g., logically and/or physically) with the clusters. As shown, the multiple tiers of storage include storage that is accessible through a network 764, such as a networked storage 775 (e.g., a storage area network or SAN, network attached storage or NAS, etc.). The multiple tiers of storage further include instances of local storage (e.g., local storage $772_{11}, \ldots,$ local storage $772_{1M}$). For example, the local storage can be within or directly attached to a server and/or appliance associated with the nodes. Such local storage can include solid state drives (SSD $773_{11}, \ldots,$ SSD $773_{1M}$), hard disk drives (HDD $774_{11}, \ldots,$ HDD $774_{1M}$), and/or other storage devices.

As shown, the nodes in distributed virtualization environment 700 can implement one or more user virtualized entities (e.g., VE $758_{111}, \ldots,$ VE $758_{11K}, \ldots,$ VE $758_{1M1}, \ldots,$ VE $758_{1MK}$) such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $756_{11}, \ldots,$ host operating system $756_{1M}$), while the VMs run multiple applications on various respective guest operating systems. Such flexibility can be facilitated at least in part by a hypervisor (e.g., hypervisor $754_{11}$, . . . , hypervisor $754_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $756_{11}$, . . . , host operating system $756_{1M}$) without, in most cases, a hypervisor layer. This lightweight implementation can facilitate efficient distribution of certain software components such as applications or services (e.g., micro-services). As shown, distributed virtualization environment 700 can implement both a hypervisor-assisted virtualization environment and a container virtualization environment for various purposes.

Distributed virtualization environment 700 also comprises at least one instance of a virtualized controller to facilitate access to storage pool 770 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 760 which can, among other operations, manage the storage pool 770. This architecture further facilitates efficient scaling of the distributed virtualization system. The foregoing virtualized controllers can be implemented in distributed virtualization environment 700 using various techniques. Specifically, an instance of a virtual machine at a given node can be used as a virtualized controller in a hypervisor-assisted virtualization environment to manage storage and I/O (input/output or IO) activities. In this case, for example, the virtualized entities at node $752_{11}$ can interface with a controller virtual machine (e.g., virtualized controller $762_{11}$) through hypervisor $754_{11}$ to access the storage pool 770. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 760.

For example, a hypervisor at one node in the distributed storage system 760 might correspond to VMware ESXi software, and a hypervisor at another node in the distributed storage system 760 might correspond to Nutanix AHV software. As another virtualized controller implementation example, containers (e.g., Docker containers) can be used to implement a virtualized controller (e.g., virtualized controller $762_{1M}$) in an operating system virtualization environment at a given node. In this case, for example, the virtualized entities at node $752_{1M}$ can access the storage pool 770 by interfacing with a controller container (e.g., virtualized controller $762_{1M}$) through hypervisor $754_{1M}$ and/or the kernel of host operating system $756_{1M}$.

In certain embodiments, one or more instances of a data management agent can be implemented in the distributed storage system 760 to facilitate repurposing log files and/or any of the herein disclosed techniques. Specifically, data manager instance $755_{11}$ can be implemented in the virtualized controller $762_{11}$, and data manager instance $755_{1M}$ can be implemented in the virtualized controller $762_{1M}$. Such instances of the virtualized controller and its constituent modules can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

For example, node $752_{11}$ might be selected a leader node for the cluster to coordinate management of key-value pair data received at the system. In this case, received key-value pairs might be stored in in-memory data $714_{11}$ at node $752_{11}$. An instance of the in-memory key-value pairs might be replicated in in-memory data $714_{1M}$ at node $752_{1M}$ to facilitate certain access performance and/or load balancing objectives. The log files (e.g., log file instance $716_{11}$, . . . , log file instance $716_{1M}$), the data files (e.g., data file instance $746_{11}$, . . . , data file instance $746_{1M}$), and the index files (e.g., index file instance $748_{11}$, . . . , index file instance $748_{1M}$) implemented according to certain embodiments of the herein disclosed techniques can be partitioned and distributed across the distributed virtualization environment 700. For example, incoming key-value pairs might be dynamically distributed to various storage facilities across multiple nodes in storage pool 770 upon receipt of the key-value pairs, and then processed locally according to the herein disclosed when an in-memory flush event is detected. In other cases, certain files might be sharded (e.g., based on a file name or other unique identifier) and distributed during certain maintenance operations.

ADDITIONAL EMBODIMENTS OF THE DISCLOSURE

Additional Practical Application Examples

Figure 8:
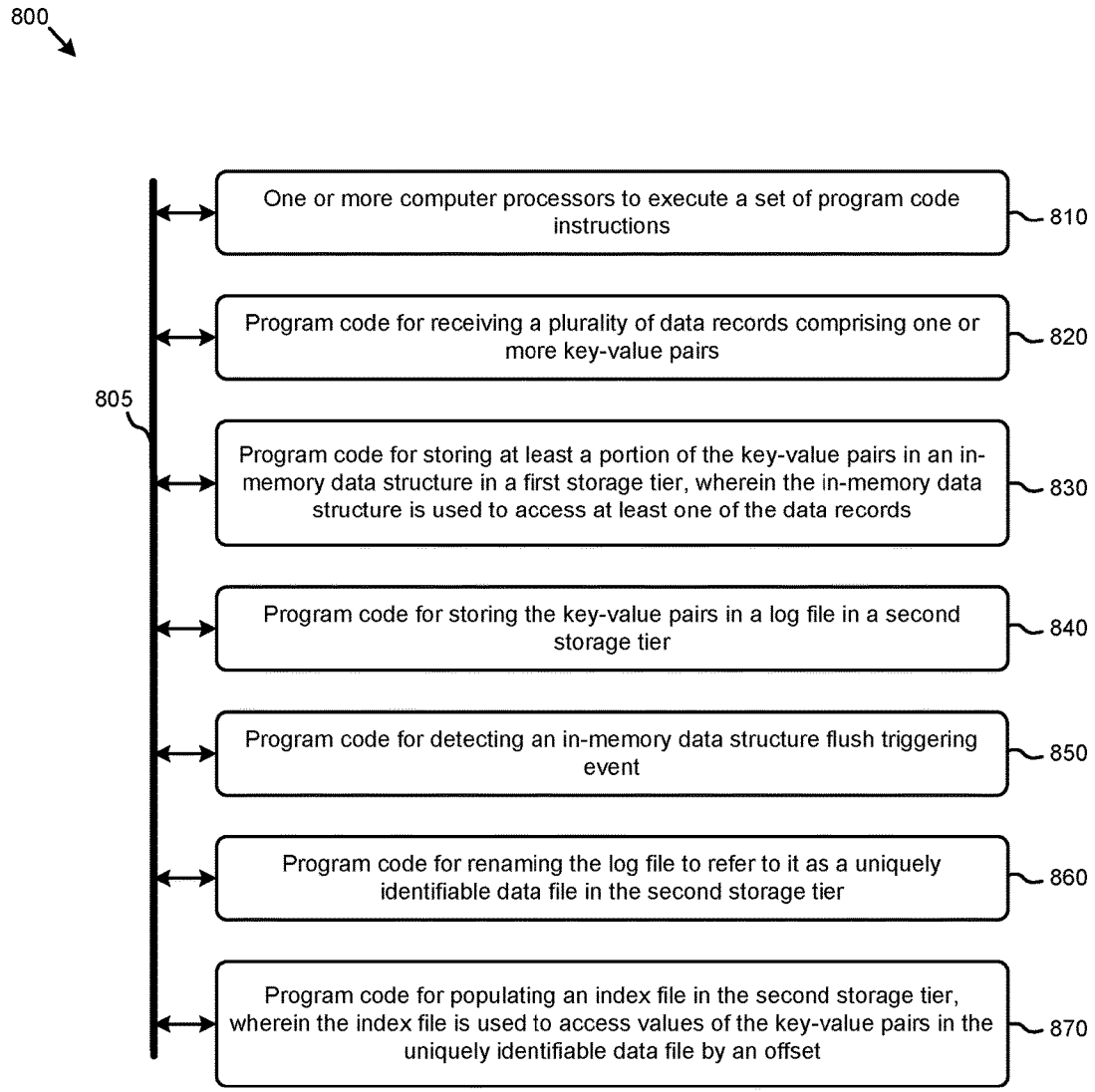
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address the problems attendant to efficiently managing access and durability of key-value pairs across storage tiers. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: receiving a plurality of data records comprising one or more key-value pairs (module 820); storing at least a portion of the key-value pairs in an in-memory data structure in a first storage tier, wherein the in-memory data structure is used to access at least one of the data records (module 830); storing the key-value pairs in a log file in a second storage tier (module 840); detecting an in-memory data structure flush triggering event (module 850); renaming the log file to refer to it as a uniquely identifiable data file in the second storage tier (module 860); and populating an index file in the second storage tier, wherein the index file is used to access values of the key-value pairs in the uniquely identifiable data file by an offset (module 870).

Variations of the foregoing may include more or fewer of the shown modules. Certain variations may perform more or fewer (or different) steps, and/or certain variations may use data elements in more, or in fewer (or different) operations.

System Architecture Overview

Additional System Architecture Examples

Figure 9A:
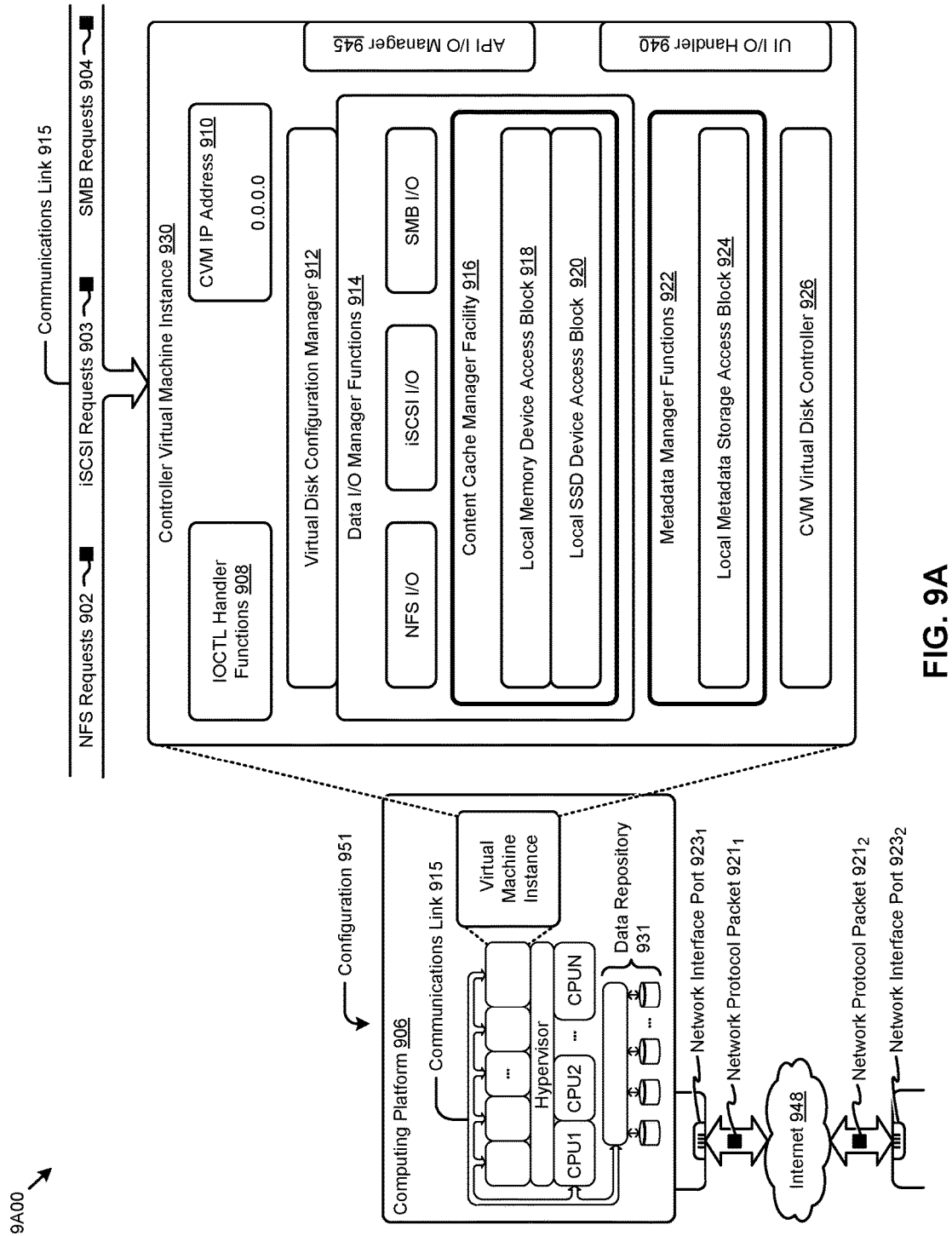
FIG. 9A, FIG. 9B and FIG. 9C depict virtualized controller architectures comprising collections of interconnected components suitable for implementing embodiments of the present disclosure and/or for use in the herein-described environments.

FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, the virtual machine architecture 9A00 comprises a collection of interconnected components suitable for implementing embodiments of the present disclosure and/or for use in the herein-described environments. Moreover, the shown virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O as received from any or every source within the computing platform. An example implementation of such a virtual machine that processes storage I/O is depicted as 930.

In this and other configurations, a controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through the shown API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 930 includes content cache manager facility 916 that accesses storage locations, possibly including local dynamic random access memory (DRAM) (e.g., through the local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). External data repository 931 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 924. External data repository 931 can be configured using CVM virtual disk controller 926, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port 923$_1$ and network interface port 923$_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet 921$_1$ and network protocol packet 921$_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to the other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to purging key-value pairs from an in-memory storage tier to an on-disk storage tier. In some embodiments, a module may include one or more state machines and/or combinational logic used to implement or facilitate the operational and/or performance characteristics pertaining to purging key-value pairs from an in-memory storage tier to an on-disk storage tier.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of purging key-value pairs from an in-memory storage tier to an on-disk storage tier). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to purging key-value pairs from an in-memory storage tier to an on-disk storage tier, and/or for improving the way data is manipulated when performing computerized operations pertaining to flushing data records from one storage tier to a data file of another storage tier by renaming an existing log file comprising the data records to the data file and indexing the data records of the data file.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
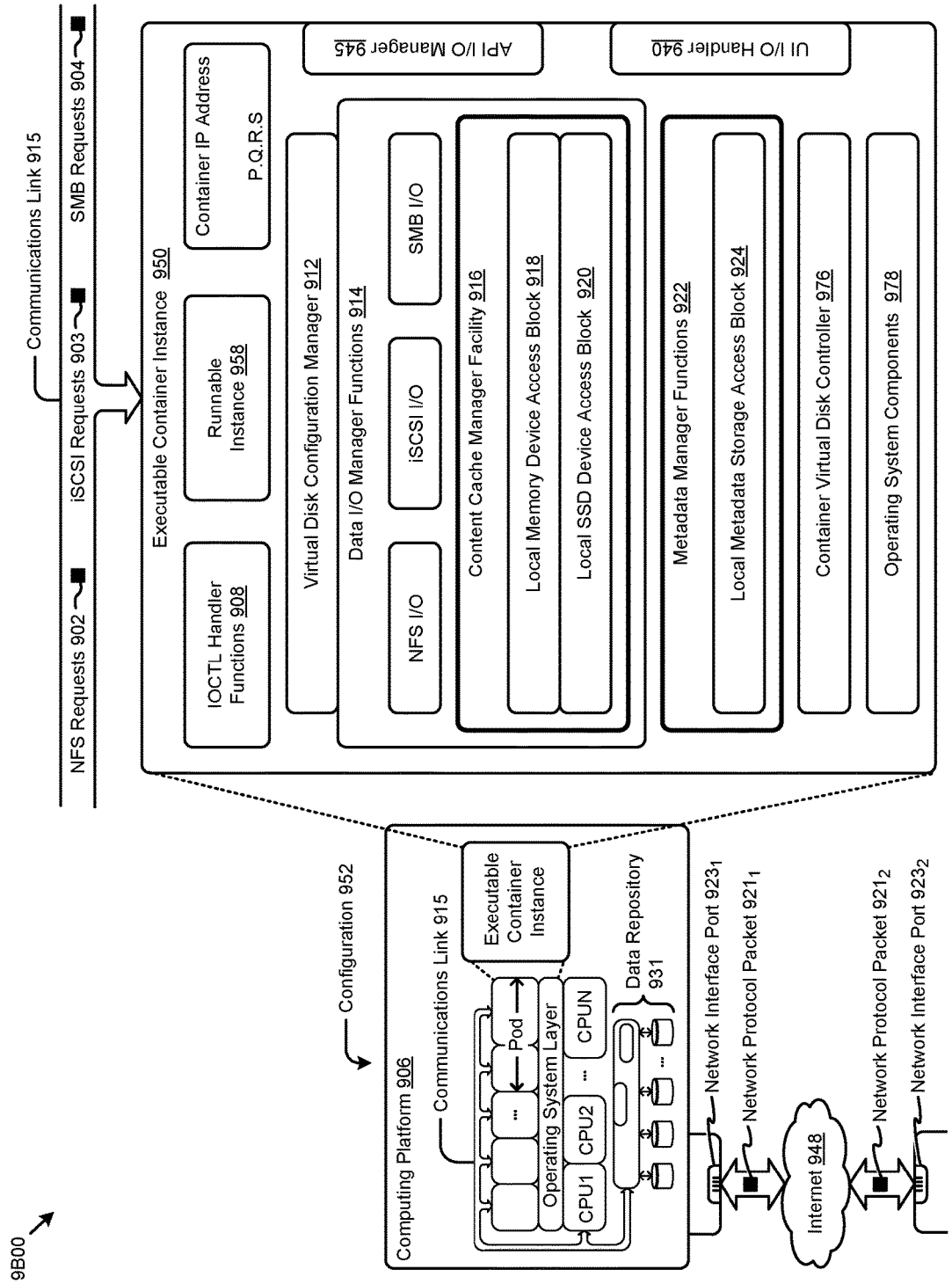

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to the executable container instance 950. Configuration 952 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, however such a container virtual disk controller does not rely on a hypervisor or any particular operating system to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
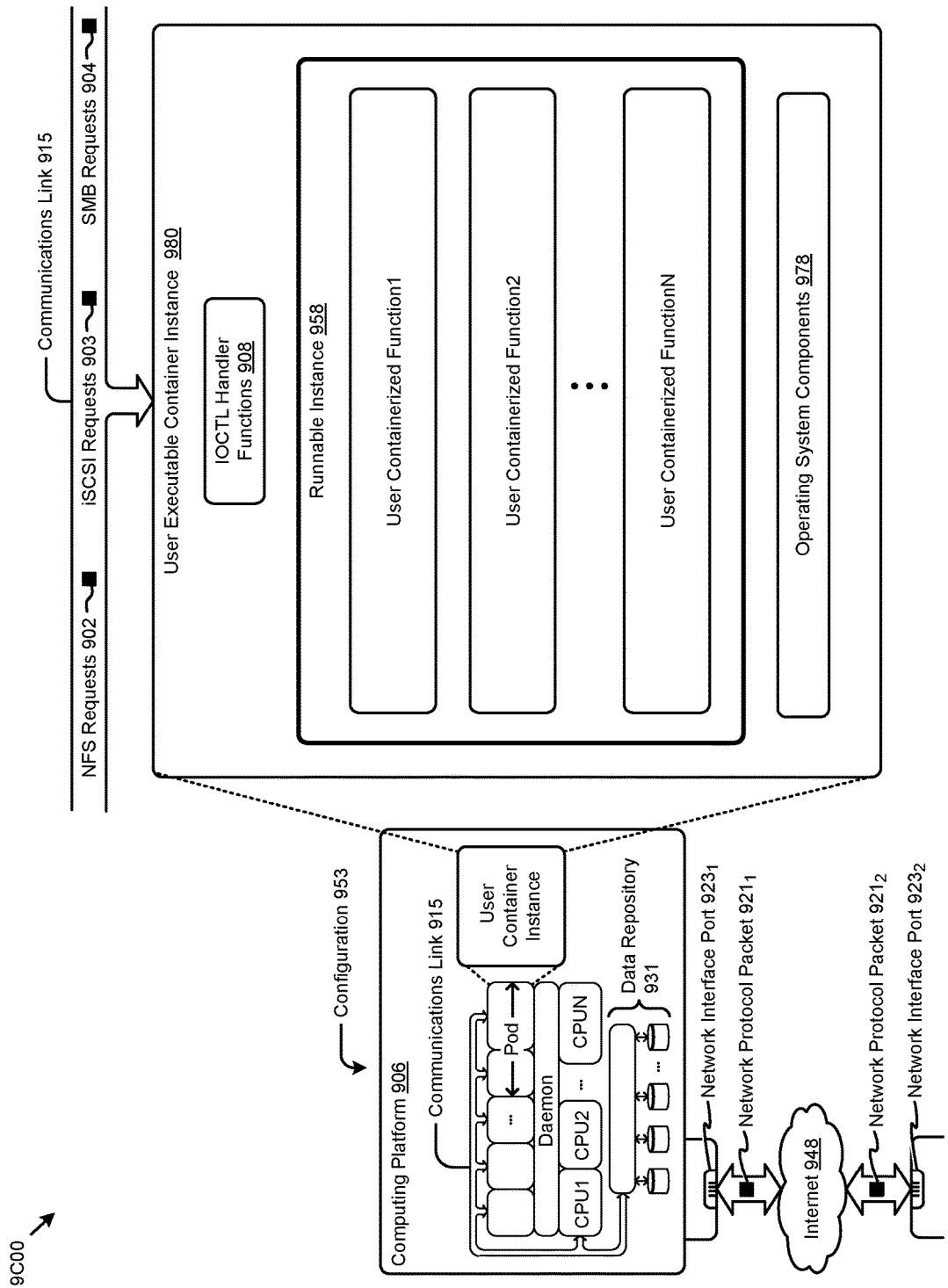

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown daemon-assisted containerized architecture 9C00 includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this daemon-assisted containerized architecture 9C00, computing platform 906 might or might not host operating system components other than operating system components 978. More specifically, the shown daemon might or might not host operating system components other than operating system components 978 of user executable container instance 980.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
receiving a data record comprising a key-value pair;
storing the key-value pair in an in-memory data structure in a first storage tier, wherein the in-memory data structure is used to access the data record;
storing a log entry for the key-value pair in a log file in a second storage tier;
renaming the log file in place in the second storage tier, said renaming comprising assignment of a new filename to the log file, wherein an index file points to the log entry in the log file corresponding to the new filename, the index file being used to access the key-value pair; and
storing a new log entry in a new log file, the new log file storing the new log entry comprising a key-value pair.

2. The method of claim 1, wherein at least one of, the in-memory data structure, the log file, or the index file, is partitioned across a storage pool.

3. The method of claim 1, wherein the in-memory data structure associates a value from the key-value pair or a pointer to the value with a key from the key-value pair.

4. The method of claim 1, wherein renaming the log file is responsive to a flush event invoked based at least in part on a memory utilization threshold or a search efficiency threshold.

5. The method of claim 1, wherein the index file is configured to point to the log entry in the log file by populating the index file with a file pointer and offset to a data value in the log file corresponding to the new filename.

6. The method of claim 1, further comprising performing a maintenance operation on an instance of the log file or the index file.

7. The method of claim 1, further comprising performing a maintenance operation on an instance of the log file or the index file, and wherein the maintenance operation comprises at least one of, a sort operation, a merge operation, a delete operation, a compact operation, a compress operation, a partition operation, or a distribute operation.

8. The method of claim 1, further comprising performing a partition operation on an instance of the log file or the index file, and wherein the partition operation comprises assigning a first portion of keys to a first node in a computing cluster and distributing a second portion of keys to a second node in the computing cluster.

9. The method of claim 1, wherein the key-value pair is one of a plurality of key-value pairs organized in the in-memory data structure in a binary search tree structure.

10. The method of claim 1, wherein the key-value pair is one of a plurality of key-value pairs in the in-memory data structure comprise heterogeneous key-value pairs.

11. A non-transitory computer readable medium having stored thereon a sequence of instructions which, when executed by a processor performs a set of acts, comprising:
receiving a data record comprising a key-value pair;
storing the key-value pair in an in-memory data structure in a first storage tier, wherein the in-memory data structure is used to access the data record;
storing a log entry for the key-value pair in a log file in a second storage tier;
renaming the log file in place in the second storage tier, said renaming comprising assignment of a new filename to the log file, wherein an index file points to the log entry in the log file corresponding to the new filename, the index file being used to access the key-value pair; and
storing a new log entry in a new log file, the new log file storing the new log entry comprising a key-value pair.

12. The computer readable medium of claim 11, wherein at least one of, the in-memory data structure, the log file, or the index file, is partitioned across a storage pool.

13. The computer readable medium of claim 11, wherein the in-memory data structure associates a value from the key-value pair or a pointer to the value with a key from the key-value pair.

14. The computer readable medium of claim 11, wherein renaming the log file is responsive to a flush event invoked based at least in part on a memory utilization threshold or a search efficiency threshold.

15. The computer readable medium of claim 11, wherein the index file is configured to point to the log entry in the log file by populating the index file with a file pointer and offset to a data value in the log file corresponding to the new filename.

16. The computer readable medium of claim 11, the set of acts further comprising performing a maintenance operation on an instance of the log file or the index file.

17. The computer readable medium of claim 11, the set of acts further comprising performing a maintenance operation on an instance of the log file or the index file, and wherein the maintenance operation comprises at least one of, a sort operation, a merge operation, a delete operation, a compact operation, a compress operation, a partition operation, or a distribute operation.

18. The computer readable medium of claim 11, the set of acts further comprising performing a partition operation on an instance of the log file or the index file, and wherein the partition operation comprises assigning a first portion of keys to a first node in a computing cluster and distributing a second portion of keys to a second node in the computing cluster.

19. A system, comprising:
a storage medium having stored thereon a sequence of instructions; and
a processor that executes the sequence of instructions to cause a set of acts, comprising, receiving a data record comprising a key-value pair;

storing the key-value pair in an in-memory data structure in a first storage tier, wherein the in-memory data structure is used to access the data record;

storing a log entry for the key-value pair in a log file in a second storage tier;

renaming the log file in place in the second storage tier, said renaming comprising assignment of a new filename to the log file, wherein an index file points to the log entry in the log file corresponding to the new filename, the index file being used to access the key-value pair; and storing a new log entry in a new log file, the new log file storing the new log entry comprising a key-value pair.

20. The system of claim 19, wherein at least one of, the in-memory data structure, the log file, or the index file, is partitioned across a storage pool.

* * * * *